March 11, 1958  M. J. LANNI ET AL  2,826,080
RELEASABLE LOCKING DEVICE
Filed Feb. 5, 1954  2 Sheets-Sheet 1

INVENTORS
MICHAEL J. LANNI
STANLEY J. NOCEK
BY
ATTORNEY

March 11, 1958  M. J. LANNI ET AL  2,826,080
RELEASABLE LOCKING DEVICE

Filed Feb. 5, 1954  2 Sheets-Sheet 2

INVENTORS
MICHAEL J. LANNI
STANLEY J. NOCEK
BY Geo. J. Hyde
ATTORNEY

United States Patent Office 2,826,080
Patented Mar. 11, 1958

2,826,080

RELEASABLE LOCKING DEVICE

Michael J. Lanni, Jersey City, and Stanley J. Nocek, Fairlawn, N. J., assignors to Bendix Aviation Corporation, Teterboro, N. J., a corporation of Delaware Application February 5, 1954, Serial No. 408,422

7 Claims. (Cl. 74—5.1)

This invention relates to locking devices for elements movably mounted in a casing, adapted to prevent inopportune movement, as during shipping, and releasable to allow movement when desirable. It is particularly suitable for holding in fixed position during shipment, installation and the like, the gimbal-mounted gyro unit of instruments that do not have caging devices, and releasing the gyro unit when the instrument is ready for operation.

Gyro units of this type are delicate precision instruments, and must be carefully protected against dust and moisture. They therefore are generally enclosed in tight casings, which may be sealed. Moreover, the casings enclose considerable mechanism and electrical components, and access to the gyro unit not only may be difficult, but is quite likely to affect the operation of relatively delicate parts by allowing dust and moisture to enter the casings, as by mechanical disturbances. It is important to prevent the gyro unit from swinging haphazardly about its almost frictionless bearings during handling and shipment, which would subject the parts to stresses not provided for by the designers. When caging devices are present, they may be utilized to prevent such undesired movement; but many gyro-actuated instruments are not thus equipped, and caging devices are too complicated to make them desirable merely for temporary locking.

Prior locking devices have been subject to a number of objections. Some of them have been complicated. Others have had no adequate protection against becoming ineffective by being displaced through jarring vibration and the like. When used to lock or cage gyros mounted in instrument casings, they have required considerable disassembling and reassembling to release the gyro, which often is seriously objectionable.

A purpose of the invention is to provide a novel and efficient releasable locking device for an element, such as a gyro unit, movably mounted within a casing, the device being arranged for release from the outside of the casing, advantageously.

A more specific purpose is to provide a novel temporary locking device that is suitable for use to lock in place the gyro unit of an instrument. A further purpose is to provide a releasable locking device having an elongated locking portion, such as a rod, extending into the casing to a remote locking point and operable from the exterior of the casing.

Some elements are mounted in casings for movement in different directions; for instance, gyro units are generally mounted in gimbals and may rotate about either of two axes at right angles. A purpose of the invention is to provide a simple locking device that will restrain such elements temporarily from movement in any direction.

A further object is to provide a temporary locking device of the indicated type removably mounted in a socket in the casing which may be readily filled after the locking device is removed, thus resealing the casing. This may advantageously comprise a threaded mounting in which the locking device is readily and effectively replaced by a threaded member, such as a screw.

A feature of the invention is the provision of a detachable locking portion of such member, arranged so that, when the need for locking is ended, such portion may be detached from the outer portion of said member, allowing the latter to remain in place. An object is to provide a locking member of this type which includes a rod whose inner locking end is detachable.

A specific purpose is to provide such a locking member in the form of a rod whose inner end may be readily broken off or otherwise removed. This is advantageously accomplished by providing the rod with a properly located weakened zone arranged to facilitate manual breaking.

A further object is to provide a temporary locking device that is simple, inexpensive, and easy to install and remove.

The foregoing and other objects and advantages of the invention will appear more fully from consideration of the detailed description which follows, taken with the accompanying drawings wherein one embodiment of the invention is illustrated. It is to be expressly understood, however, that the drawings are for the purposes of illustration and description and are not to be construed as defining the limits of the invention.

Figure 1:
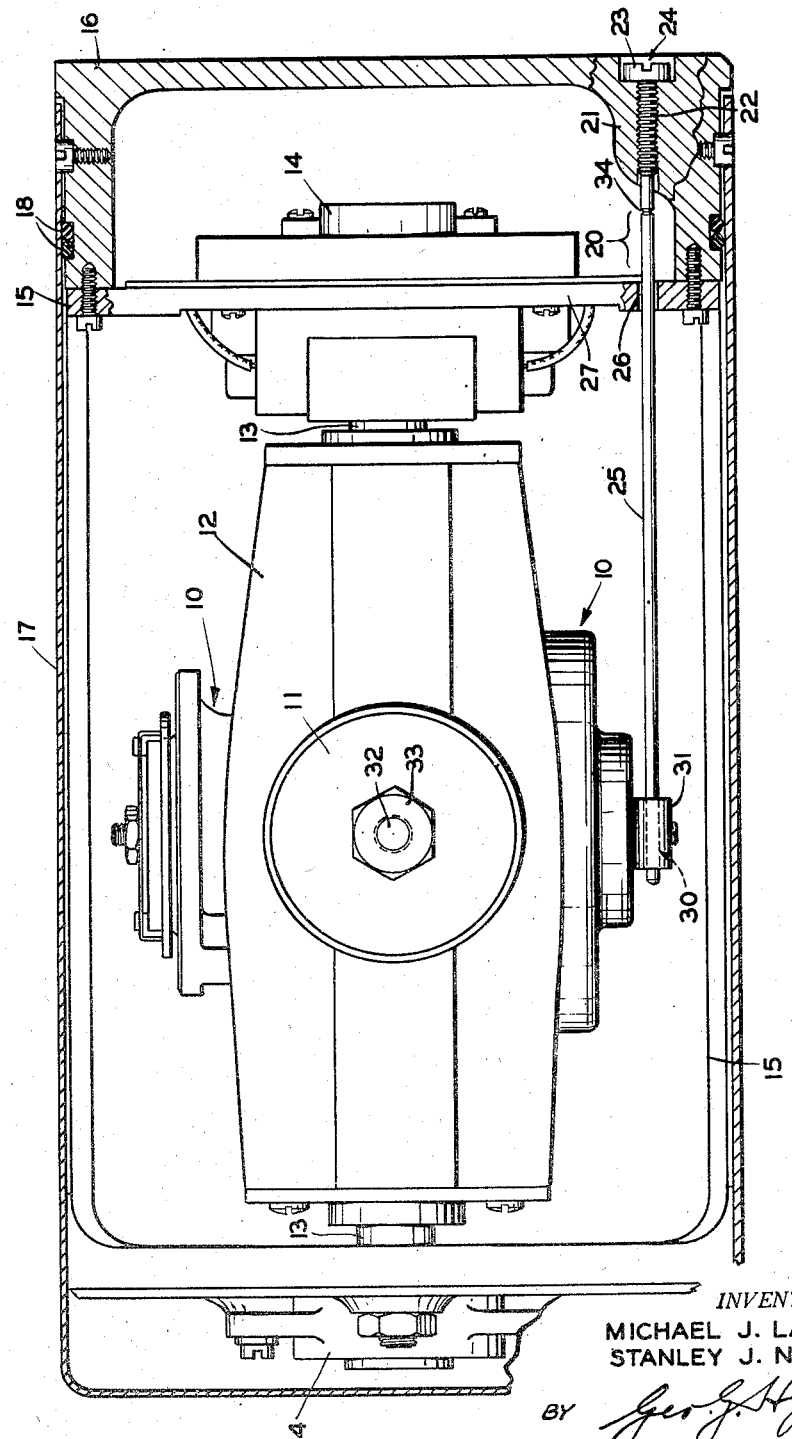
Fig. 1 is a side elevation of a gyro unit mounted in a casing, with portions of the casing shown in section.
Figure 2:
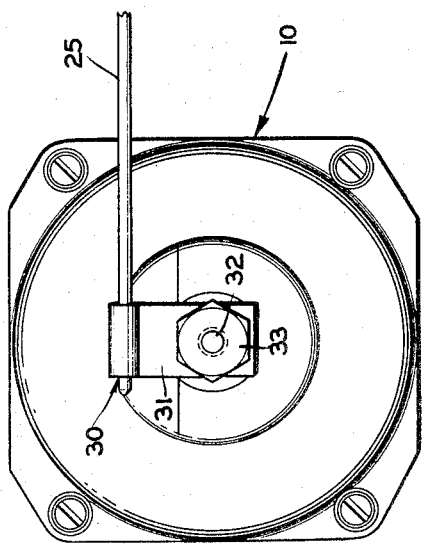
Fig. 2 is an end view of the gyro unit, showing the retaining portion of the locking device.
Figure 3:
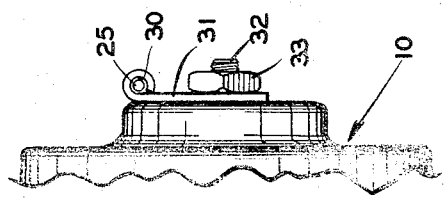
Fig. 3 is a side elevation of the arrangement shown in Fig. 2.

The invention is illustrated in its application to a gyro unit mounted on a gimbal in a sealed casing, immaterial portions of the structure being omitted. In the drawing, the gyro unit 10 is mounted on transverse trunnions in bearings 11 (one of which is shown) on gimbal 12, which is provided with trunnions 13 extending into bearings 14 on frame 15, a cover 16 being mounted on one end of the frame. A casing 17 fits over and encloses the frame 15 and the sides of cover 16, which is provided with sealed rings 18 forming an enclosure for the apparatus that is sealed against dust and moisture. This portion of the structure is well known in this form and in a large number of variations thereof which employ the same general arrangement and purpose.

The locking member 20 comprises a mounting portion 21 including a threaded shank 22 fitting snugly into a bore in cover 16, and a screw head 23 in a recess 24 in said cover. Locking rod 25, forming a rigid extension of shank 22, passes through an aperture 26 in wall 27 of frame 15, and into a suitable retaining device or socket on gyro unit 10. In the form illustrated, this socket comprises a longitudinal bore 30 in retainer 31 mounted on gyro unit 10, as by bolt 32 extending through said retainer, which is held in place by nut 33. Retainer 31 is conveniently constructed of strip metal as shown, with the end bent to form the cylindrical bore or passage 30 fitting locking rod 25.

Said rod is advantageously made of relatively strong steel or similar metal, and may be integral with shank 22 and head 23. It is advantageously provided with a weakened zone at which it may be divided, so that the locking portion which engages retainer bore 30 may be manually broken off and discarded when locking is no longer necessary. In the form illustrated, this weakened zone comprises an annularly recessed section 34, which advantageously is located between wall 27 and cover 16.

In operation, after the gyro, frame and cover have been assembled, the locking member 20 is inserted through the recess 24, aperture 26, and retainer bore 30. Casing 17 is then slid into place and fastened. During shipment, the tendency of the gyro unit 10 to rotate about the gimbal trunnions is restrained by locking rod 25, any tendency to rotate around trunnions 13 being repressed by the stiffness of said rod, and if necessary by contact of the rod with the walls of aperture 26; while rotation about the other trunnions is restrained by engagement of rod 25 with the walls of bore 30, which fits rod 25 with sufficient snugness and engages it at sufficiently spaced points to prevent any material motion about the transverse trunnions. Shank 22 and head 23 fit cap 16 tightly, maintaining the sealed condition of the apparatus.

After the apparatus has been set up and is ready for use, the gyro unit 10 may be unlocked simply by unscrewing shank 22 and removing rod 25, breaking the rod at section 34, discarding the locking portion, and screwing shank 22 back into tight sealing engagement with cover 16. This can be performed in a few minutes without interference with any part of the mechanism, entirely from the exterior and without disturbing any window structure, indicating parts or other elements which are sometimes employed in place of the plain cover 16.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

We claim:

1. A releasable locking device for an element movably mounted in a casing, comprising a locking member including an elongated retaining portion engaging said element and fitting an aperture therein, and a mounting portion extending through and releasably engaging the casing, said locking member having a manually breakable weakened zone arranged for detachment and removal of the retaining portion and replacement of the retaining portion in said aperture.

2. A releasable locking device for an element movably mounted in a casing, comprising a locking member including a retaining rod portion engaging said element and fitting an aperture therein and a mounting portion extending through and releasably engaging the casing, said rod portion having a manually breakable zone of reduced diameter arranged for detachment and removal of the retaining portion and replacement of the mounting portion in said aperture.

3. A releasable locking device for an element movably mounted in a casing, comprising a unitary locking member including an elongated retaining portion engaging said element and an integral mounting portion extending through and releasably engaging the casing, and a bracing element located adjacent to the elongated portion in position to resist lateral movement of the latter portion.

4. A releasable locking device for an element movably mounted in a casing, comprising a unitary locking member including a retaining rod portion having an end section engaging said element and an integral mounting portion extending through and releasably engaging the casing, and an abutment having bracing walls normally spaced from the rod, between which the rod portion is movably positioned, said walls being located in position for transverse supporting engagement of the rod when said rod is laterally deflected from normal position.

5. A releasable locking device for a gyro unit mounted for rotation about an axis in a casing, comprising a retaining device on the gyro element, and a locking member including a retaining portion engaging said retaining device and a mounting portion detachably connected to the retaining portion and in releasable sealed engagement with an aperture in the casing, said locking member being removable through said aperture, and the mounting portion being replaceable in sealing engagement with the aperture after the retaining portion is removed.

6. A releasable locking device for a gyro unit mounted in a sealed casing for rotation about an axis, comprising a retaining device on the gyro unit, a locking member including an elongated retaining portion engaging said device and a mounting portion threaded in an aperture in the casing, said locking member being removable through the aperture and having a manually breakable weakened zone, said mounting portion being replaceable in threaded engagement with the aperture to seal the casing after the retaining portion is removed by breaking in said zone.

7. A releasable locking device for a gyro unit movably mounted in a casing, comprising a retaining device on the gyro unit, and a unitary locking member, including a retaining portion engaging said device and located within the casing, and an integral mounting portion removably engaging the casing, said locking member comprising means for manually separating and removing the retaining portion from the mounting portion, including a manually breakable section connecting said portions of the locking member.

References Cited in the file of this patent

UNITED STATES PATENTS

| | | |
|---|---|---|
| 942,952 | Wrather | Dec. 14, 1909 |
| 1,291,031 | Leavitt | Jan. 14, 1919 |
| 2,022,290 | Large | Nov. 26, 1935 |
| 2,415,899 | Meyer et al. | Feb. 18, 1947 |
| 2,423,270 | Summers | July 1, 1947 |

FOREIGN PATENTS

| | | |
|---|---|---|
| 316,671 | Italy | Apr. 12, 1934 |